(12) United States Patent
Gorman et al.

(10) Patent No.: US 12,541,769 B2
(45) Date of Patent: *Feb. 3, 2026

(54) SYSTEM TO FACILITATE PROPRIETARY DATA RESTRICTION COMPLIANCE FOR AN ENTERPRISE

(71) Applicant: Hartford Fire Insurance Company, Hartford, CT (US)

(72) Inventors: Michael R. Gorman, Paramus, NJ (US); Scott Mitchell Mackenthun, West Hartford, CT (US); James A. Madison, Windsor, CT (US); Daniel L O'Connell, Middletown, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/765,898

(22) Filed: Jul. 8, 2024

(65) Prior Publication Data

US 2024/0362652 A1 Oct. 31, 2024

Related U.S. Application Data

(63) Continuation of application No. 16/679,495, filed on Nov. 11, 2019, now Pat. No. 12,067,579.

(51) Int. Cl.
*G06F 21/64* (2013.01)
*G06Q 30/018* (2023.01)

(52) U.S. Cl.
CPC ................ *G06Q 30/018* (2013.01)

(58) Field of Classification Search
CPC .............. G06F 21/6245; G06Q 30/018
See application file for complete search history.

(56) References Cited

U.S. PATENT DOCUMENTS

| 9,465,778 | B1 * | 10/2016 | DeBo ............. G06F 16/21 |
| 9,477,660 | B2 * | 10/2016 | Scott ............. G06F 21/552 |
| 9,754,027 | B2 * | 9/2017 | Antic ............. G06F 21/6227 |
| 10,521,442 | B1 * | 12/2019 | Gatchell ......... G06F 16/2474 |

(Continued)

OTHER PUBLICATIONS

Abdullah H. A structural and navigational method for integrated organizational information privacy protection. In2018 International Conference on Advances in Big Data, Computing and Data Communication Systems (icABCD) Aug. 6, 2018 (pp. 1-9). IEEE. (Year: 2018).*

*Primary Examiner* — Catherine Thiaw
(74) *Attorney, Agent, or Firm* — Buckley, Maschoff & Talwalkar LLC

(57) ABSTRACT

According to some embodiments, an enterprise proprietary data store contains a set of electronic data records, each electronic data record having with proprietary data and an associated governance structure. A compliance computer platform may receive the proprietary data and associated governance structure from the enterprise proprietary data store and define enterprise-wide decision accountabilities for the proprietary data based on the governance structure. The compliance computer platform may also define privacy objectives for the proprietary data based on the governance structure along with specific machine-level controls to test and confirm compliance with the governance structure.

17 Claims, 16 Drawing Sheets

(56) References Cited

U.S. PATENT DOCUMENTS

| | | | |
|---|---|---|---|
| 2010/0324952 A1* | 12/2010 | Bastos | G06Q 30/018 |
| | | | 705/317 |
| 2012/0004945 A1* | 1/2012 | Vaswani | G06Q 10/06 |
| | | | 705/7.28 |
| 2013/0117196 A1* | 5/2013 | Fuad | G06Q 10/10 |
| | | | 705/317 |
| 2017/0308714 A1* | 10/2017 | Drost-Hansen | G06F 16/24573 |
| 2020/0242526 A1* | 7/2020 | Sampath | G06Q 10/06393 |
| 2021/0099494 A1* | 4/2021 | Kuehr-Mclaren | H04L 63/20 |

* cited by examiner

|  | Low | Medium | High |
|---|---|---|---|
| High | SILVER | GOLD | GOLD |
| Medium | BRONZE | SILVER | SILVER |
| Low | BRONZE | BRONZE | BRONZE |

Decision Magnitude (y-axis) / Direct Processing (x-axis)

SYSTEM TO FACILITATE PROPRIETARY DATA RESTRICTION COMPLIANCE FOR AN ENTERPRISE

CROSS REFERENCE TO RELATED APPLICATION

This is a continuation of U.S. patent application Ser. No. 16/679,495, entitled "SYSTEM TO FACILITATE PROPRIETARY DATA RESTRICTION COMPLIANCE FOR AN ENTERPRISE", filed Nov. 11, 2019, the entire contents of which are incorporated herein by reference for all purposes.

BACKGROUND

In some cases, an enterprise might use data that is proprietary in nature. For example, the data might be associated with user privacy issues, third-party information that is associated with contractual and other restrictions, etc. Enterprises and individuals are becoming more aware and protective of their data and its usage. For example, California and the European Union have both passed legislation to protect customers' personal data. In these pieces of legislation, the burden often falls to the user of the data (e.g., the enterprise) to prove that the data is being appropriately protected. This may put limitations and restrictions on an enterprise that handles data and require it to adapt to a changing environment with checks and balances that comply with such obligations.

Similarly, an enterprise might have contractual or regulatory obligations for the information they possess or have purchased. For example, an insurance company might be required to identify all users of the enterprise (e.g., employees) who can access the proprietary information of another enterprise. Navigating these contracts and regulations can be a time consuming and error prone task—especially when there is a substantial amount of information and/or a large number of requirements. For example, one of these requirements might dictate the removal of information from numerous systems throughout an enterprise within a specified period of time.

It would be desirable to create a system to scan through and simplify the obligations from various entities (e.g., governments or contracts) for an enterprise using proprietary data. It would also be desirable to have a system that checks for compliance with these agreements, reduces the risk of error, and can be used as evidence of compliance. Another desirable goal would be to simplify the process by utilizing technology and software designed to optimize the accuracy of results and reduce how long it takes to complete the process.

SUMMARY OF THE INVENTION

According to some embodiments, systems, methods, apparatus, computer program code and means are provided to facilitate proprietary data restriction compliance for an enterprise. In some embodiments, a compliance computer platform may receive the proprietary data and associated governance structure from the enterprise proprietary data store and define enterprise-wide decision accountabilities for the proprietary data based on the governance structure. The compliance computer platform may also define privacy objectives for the proprietary data based on the governance structure along with specific machine-level controls to test and confirm compliance with the governance structure.

Some embodiments comprise: means for receiving, by a compliance computer platform, proprietary data and an associated governance structure from an enterprise proprietary data store, wherein the enterprise proprietary data store contains a set of electronic data records, each electronic data record having proprietary data and an associated governance structure; means for defining, by the compliance computer platform, enterprise-wide decision accountabilities for the proprietary data based on the governance structure; means for defining, by the compliance computer platform, privacy objectives for the proprietary data based on the governance structure; and means for defining, by the compliance computer platform, specific machine-level controls to test and confirm compliance with the governance structure.

In some embodiments, a communication device associated with a back-end application computer server exchanges information with remote devices. The information may be exchanged, for example, via public and/or proprietary communication networks.

According to some embodiments, systems, methods, apparatus, computer program code and means are provided to fulfill and prove compliance to contracts and/or regulations related to the protection of proprietary data. In some embodiments, a system will be put in place to read through contracts and separate out the proprietary data restrictions and limitations listed in the contracts. These restrictions and limitations may then be converted into simplified obligations of an enterprise to prove compliance. In some embodiments, the simplified requirements can be input into a software that will distribute the requirements across the enterprise and collect information that will prove compliance to the obligations for legal purposes.

In some embodiments, the system might be used to tag and track data elements as it travels throughout the enterprise's databases. The tagged data can then be identified and described by a system. The system can then identify all users who have access to read the data and alert the enterprise if any of the data is sensitive.

In some embodiments, a system will need to identify all owners of the different applications and databases in the enterprise. The system will then distribute the simplified obligations from a centralized location to the various owners that have been identified. The system will then record and compile the responses from the owners to be returned to a centralized location.

In some embodiments, a system will differentiate between data that is owned by a third-party and data that is owned by the first party. The system may also identify data that belongs to an individual and data that belongs to the first party. These data elements can then be separated out, and, if necessary, a system may delete or replace the data that does not belong to the first party.

Some technical effects of some embodiments of the invention are improved and computerized ways to accurately and efficiently facilitate proprietary data restriction compliance for an enterprise. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 10 is a data characterization map according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of one or more electronic data record management and deployment by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, managed, and/or used to deploy proprietary data protection mechanisms, such as by deploying and/or using computing components, and results may then be analyzed accurately and used to ensure compliance with applicable restrictions, thus improving the overall performance of an enterprise (e.g., by improving the effectiveness and/or reducing the number of data searches and reviews that need to be processed via a network and/or communication links). Moreover, embodiments might further improve performance values, response times, resource allocation decisions, etc.

Figure 1:
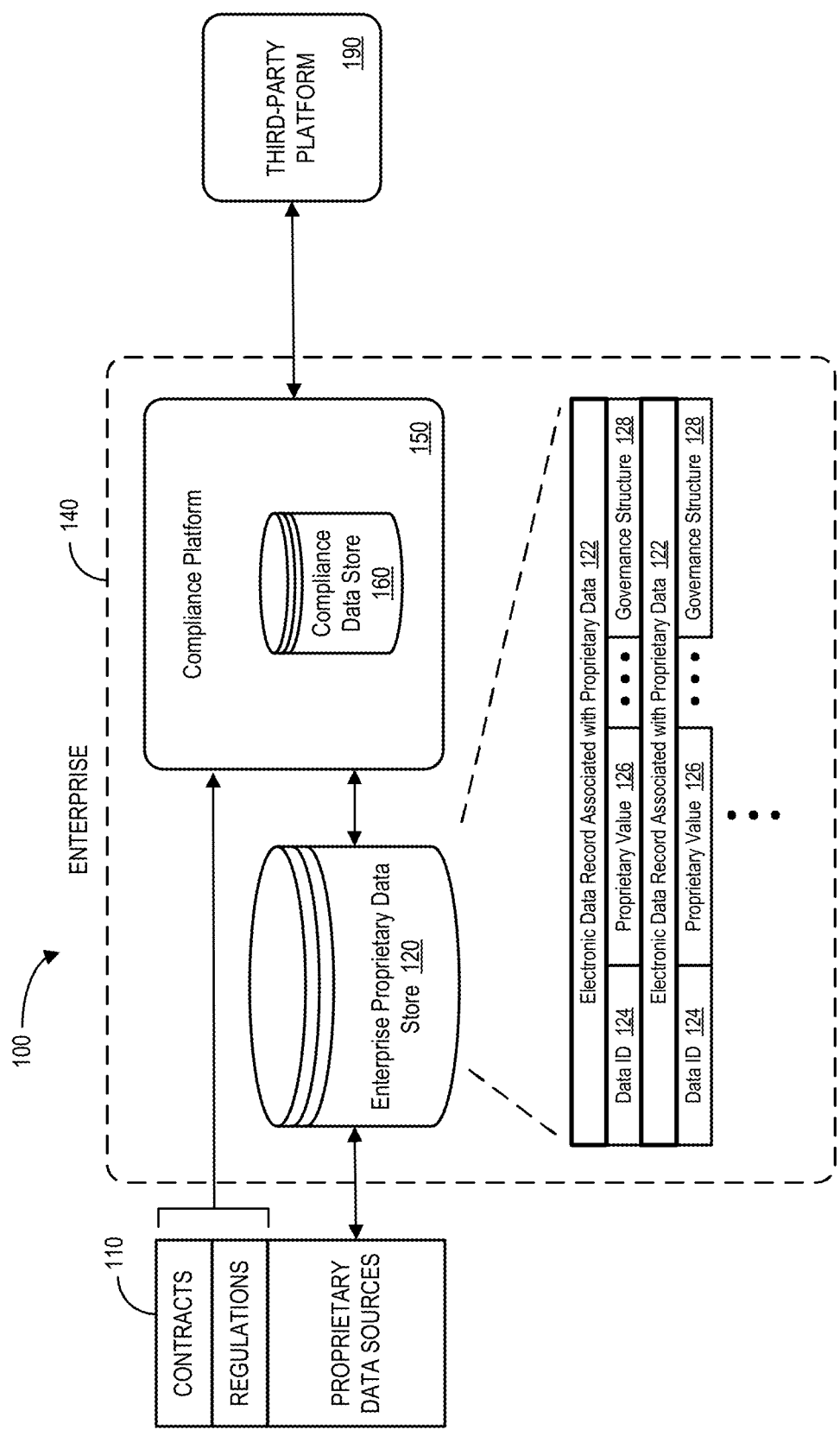
FIG. 1 is a high-level block diagram of an enterprise system according to some embodiments.

In some cases, an enterprise might want to use proprietary data. For example, a business might want to use customer names, credit scores, addresses, etc. In some cases, the enterprise might try to manually ensure compliance with any restrictions associated with this type of data. Such an approach, however, can be a time consuming and error-prone process. It would be desirable to provide systems and methods to accurately and efficiently facilitate proprietary information restriction compliance for an enterprise, while allowing for flexibility and effectiveness when creating, reviewing, and/or monitoring compliance as appropriate. FIG. 1 is a high-level block diagram of a system 100 according to some embodiments of the present invention. In particular, the system 100 includes proprietary data sources 110 accessed by an enterprise 140. In particular, the enterprise 140 includes an enterprise proprietary data store 120 and a compliance platform 150 that receives contracts and/or regulations associated with the proprietary data sources 110 and works to ensure compliance with an applicable restriction (and evidence of compliance may be stored into a compliance data store 160). According to some embodiments, a third-party platform 190 may also exchange data with the enterprise 140.

Note that the compliance platform 150 (and/or other components of the system 100) may also exchange information with a remote user terminal (e.g., via a firewall). According to some embodiments, a back-end application computer server and/or the remote user terminal may facilitate viewing, receiving, and/or interacting with data about proprietary information. According to some embodiments, the compliance platform 150 (and/or other devices described herein) might be associated with a third-party, such as a vendor that performs a service for an enterprise.

The compliance platform 150 and/or other devices described herein might be, for example, associated with a Personal Computer ("PC"), laptop computer, smartphone, an enterprise server, a server farm, and/or a database or similar storage devices. According to some embodiments, an "automated" compliance platform 150 may facilitate an automated process to protect information store as electronic data records in the enterprise proprietary data store 120. As used herein, the term "automated" may refer to, for example, actions that can be performed with little (or no) intervention by a human.

As used herein, devices, including those associated with the compliance platform 150 and/or any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The compliance platform 150 may store information into and/or retrieve information from the enterprise proprietary data store 120. The enterprise proprietary data store 120 might, for example, store electronic records associated with proprietary data 122, including, for example, data identifiers 124, proprietary values 126 (e.g., Social Security Numbers), governance structures 128, etc. The enterprise proprietary data store 120 may be locally stored or reside remote from the compliance platform 150. As will be described further below, the enterprise proprietary data store 120 may be used deploy and manage compliance strategies for the enterprise 140. Although a single compliance platform 150 is shown in FIG. 1, any number of such devices may be included. Moreover, various devices described herein might be combined according to embodiments of the present invention. For example, in some embodiments, the compliance platform 150 and/or the enterprise proprietary data store 120 might be co-located and/or may comprise a single apparatus.

Figure 2:
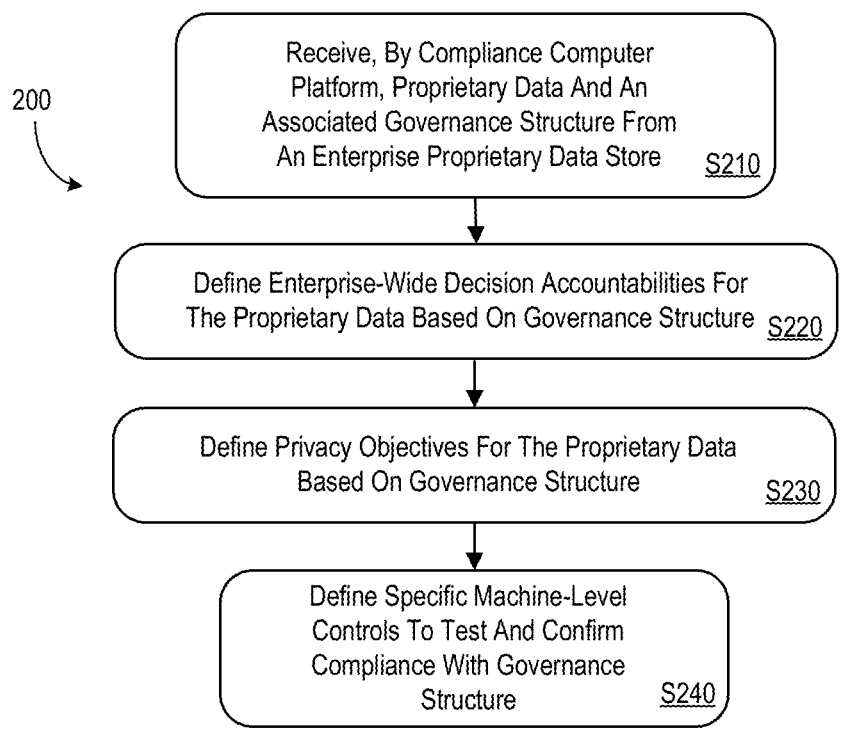
FIG. 2 illustrates an automated proprietary data restriction compliance method according to some embodiments.

The system 100 of FIG. 1 is provided only as an example, and embodiments may be associated with additional elements or components. According to some embodiments, the elements of the system 100 may automatically facilitate deployment of proprietary data restriction compliance solutions for an enterprise. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a compliance computer platform may receive proprietary data and an associated governance structure from an enterprise proprietary data store. The enterprise proprietary data store may contain, for example, a set of electronic data records, each electronic data record having proprietary data and an associated governance structure. At S220, the system may define enterprise-wide decision accountabilities for the proprietary data based on the governance structure. At S230, the system may define privacy objectives for the proprietary data based on the governance structure. The compliance computer platform may then define specific machine-level controls to test and confirm compliance with the governance structure at S240. Note that some or all of the information processed by the compliance computer platform (including a governance data structure and/or information proving compliance) might be stored in a secure, distributed ledger (such as a blockchain platform), a Structured Query Language ("SQL") database, a Relational Database Management System ("RDBMS") platform, a data warehouse, a Non-SQL or Non-relational databases, etc.

Figure 3:
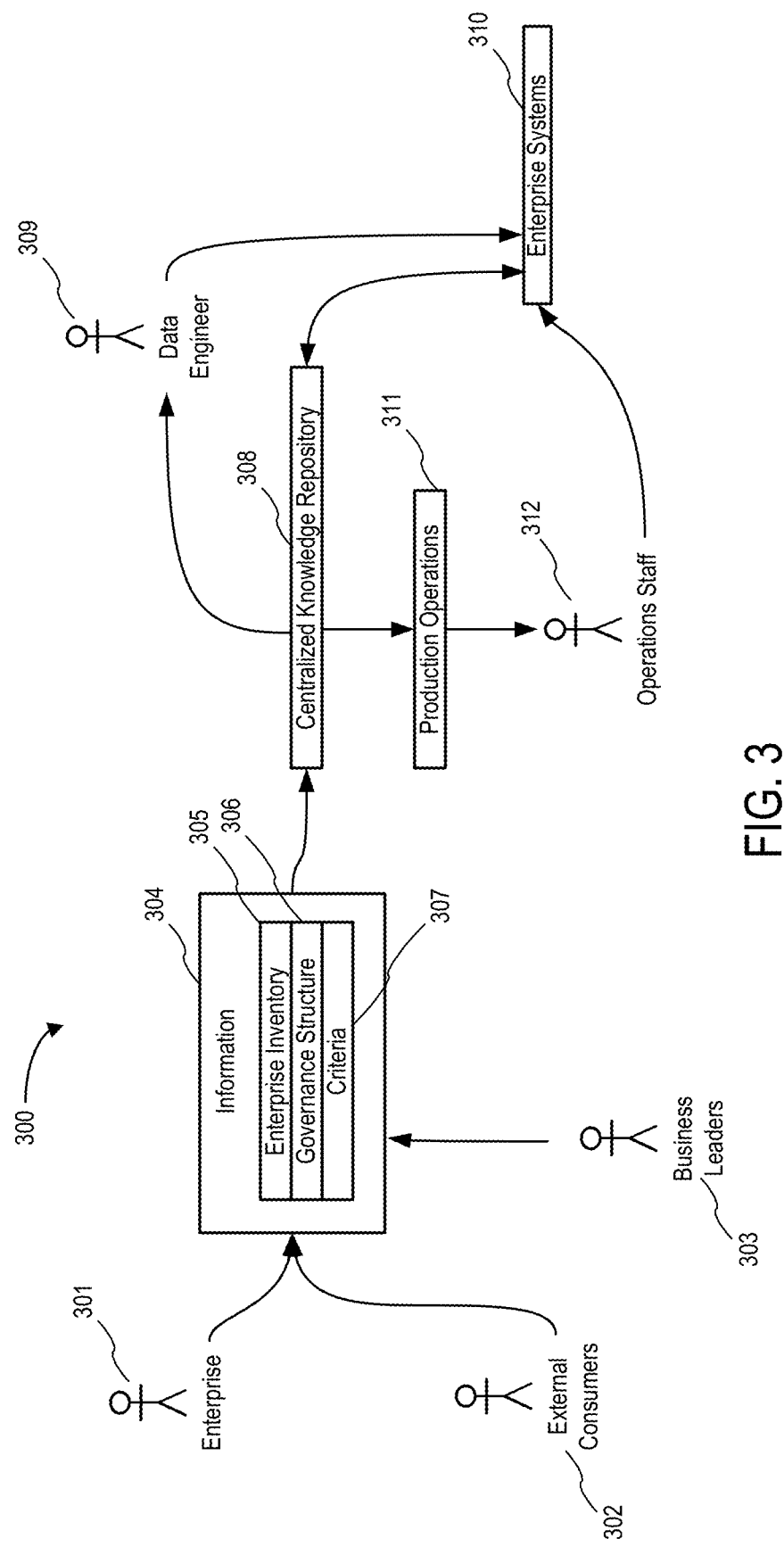
FIG. 3 is an enterprise system in accordance with some embodiments.

FIG. 3 is an enterprise system 300 in accordance with some embodiments. In some embodiments, an enterprise 301, and all its people, systems, processes, and other components have deeply embedded information 304 in the enterprise fabric, and such information 304 can be extracted and utilized in service to external consumers 302 and business leaders 303.

Where much prior art focuses on knowledge management, contract enforcement technologies, and other such activities that come after the acquisition of information, some embodiments described herein define the acquisition of information 304 as being one of the most challenging steps. This does not preclude the proper use of knowledge management, contract enforcement technologies, processes and controls, and similar mechanics, but embodiments may start with the challenging question of how to acquire, codify, persist, and retrieve in a systematic fashion the information 304 that the many mechanisms of a typical corporation have inherently embedded in the enterprise fabric.

Embodiments may provide a system and method to allow a data engineer 309, or similarly skilled roles, to traverse the enterprise 301 in service to the external customer 302 and business leaders 303. This is done by the various components and actors shown to the right of the information 304 and by the mechanisms within the information 304.

The notion of an external customer 302 may include regulators such as those associated with the Fair Credit Reporting Act ("FCRA"), the California Consumer Privacy Act ("CCPA"), General Data Protection Regulation ("GDRP"), etc. All such external customers 302 may continue to utilize embodiments described herein, simply with different business objectives.

The system 300 may maintain an enterprise inventory 305 that lists all the applications in the organization along with their properties. The enterprise inventory 305 may have a value proposition unto itself independent of embodiments described herein and is often maintained by companies before attempting to serve the contractual and regulatory obligations of the external consumers 302. A non-limiting example of this in common practice is the Configuration Management Database ("CMDB"). A typical CMDB knows the many applications of the company and their properties. Some embodiments described herein requires and constructs a solution of this nature.

A governance structure 306 may be put in place to help ensure that the enterprise inventory 305 meets the need of the system. An enterprise inventory 305 built for purposes other than proprietary data protection might not have the properties or proper valid values to help ensure compliance. The governance structure 306 may create a process to make the necessary changes to the enterprise inventory 305 and continually enhances the structure and content of the enterprise inventory to meet objectives.

The criteria 307 may be the condensed and measurable form of the objectives dictated by the external consumers 302 and business leaders 303. When those actors provide requirements, it is typically in the forms of contracts, regulations, or similarly generalized objectives. This may not be sufficient to let the data engineer 309 and operations staff 312 actually extract the information 304 needed to determine if the systems in the enterprise systems fabric actually adhere to all such requirements. An expert such as the data engineer 309 or similarly qualified individual, such as legal, underwriting, or actuarial experts, may parse the general requirements, and extract the criteria 307 that is of sufficient precision to allow engineering teams to write computer code.

The centralized knowledge repository 308 may be where the many elements of information 304 are brought together in a database of proper form for serving the needs of the data engineer 309, operations staff 312, and any other roles that are more about consumption of the gathered information 304 for the execution of some process. The centralized knowledge repository database 308 loads the information 304 through some process, such as those typically referred to as Extract, Transform, and Load (ETL). The enterprise systems 310 and production operations 311 workflows may consume the data, through mechanisms such as ETL or a Service-Oriented Architecture ("SOA") for more system-like consumption, or the technology typically referred to as Business Intelligence (BI) for more human-facing consumption.

The data engineer 309 is a pervasive role whose main purpose is to be the pollinator of knowledge. The actual knowledge is largely within the local systems. In the organizational areas of those systems there will be further data engineers 309, or other experts, such as those with business expertise, such as lawyers, actuaries, and underwriters. The data engineer 309 interacts with all such experts. However, the data engineer 309 that is directly assigned to embodiments described herein may have the particular responsibility of designing the database, ETL, BI and other system behaviors that persist the information 304, build the centralized knowledge repository 308, and deliver business value to the other components of FIG. 3.

The enterprise systems 310 are the systems that need to consume the contractual, regulatory, policy, rule, or other decision and constraints now codified to the database in the centralized knowledge repository 308. A simple but powerful non-limiting example would be to include a set of tags that affiliate a contractual or regulatory level of constraint to data. Suppose "A" means extremely constrained, "B" means highly constrained, and eventually "D" means unconstrained, each as a measure of such things as personal identity, company financial performance, and so on. Tagging every system with those values, as well as tagging the data itself with those values (since data may need to know its level even as it travels away from its origin), could then be fed down through the enterprise systems 310. A powerful example of this is capturing opt-in/out at the system of record, yet making that customer decision known in the data science and research area which may be a dozen system-transfers away. Other enterprise systems 310 with a stake in the content of the repository include the Reference Data Management ("RDM") software, the Master Data Management ("MDM") software, actuarial and research systems, the enterprise inventory 305 itself—making closed-loop value-add with some embodiments, and similar systems that must utilized and adhere to the constraints of the current invention.

The enterprise systems 310 and data engineers 309 may also execute system development activities to bring enterprise systems 310 into alignment with the information and rules now persisted in the centralized knowledge repository 308. When the data engineers 309 find that the rules are not met, system changes will be invoked through some process typically known in the industry as a Software Development Lifecycle ("SDLC"). Such improvements may be monitored by the governance structure 306, with the ultimate goal of making the workflows of the operations staff 312 more effective.

The production operations 311 may be the connection back to the external consumers 302 and business leaders 303 and meeting of their needs as a business service, typically bounded by quality and timing service-level agreements. The production operations 311 may include workflow tools and knowledge management software engineered specifically to ensure accountability of getting the customer's need served (and doing so in full alignment with the rules now captured in the centralized knowledge repository 308). A non-limiting example of such workflow software would be Archer or Service Now. A non-limiting example of executing rules as part of a system would be the Drools rules engine.

The operations staff 312 may run the production operations 311 and also interact with enterprise systems 310 in a manner that retrieves any information needed to meet the criteria 307 now persisted in the centralized knowledge repository 308. A non-limiting example is meeting the Right-to-Know requirements of a law like CCPA by going into an enterprise system 310 that holds claim information, and letting the external consumers 302 know what claim information the company has about them.

Figure 4:
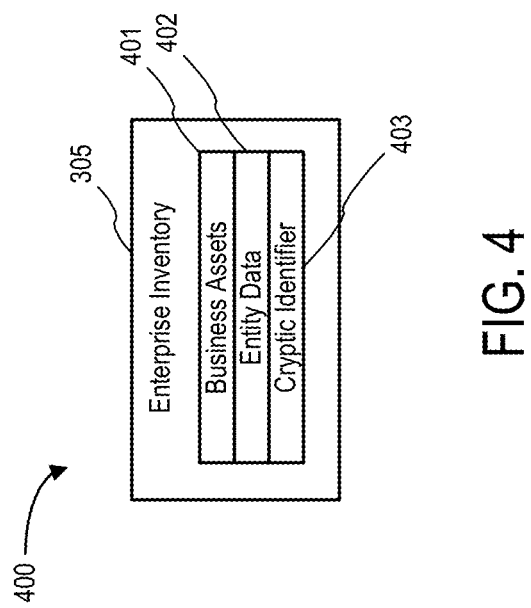
FIG. 4 is a data structure for enterprise inventory according to some embodiments.

FIG. 4 is a data structure 400 for enterprise inventory 305 according to some embodiments. The enterprise inventory 305 is built from information received from internal and external sources and contains all physical systems and data that these sources supply. Business assets 401 are business applications built to store internal and external data. These assets have owners and are maintained by the business for enterprise use. The business assets 401 can be connected to one another as well to transfer data amongst themselves. Entities data 402 is data that is supplied externally by a third-party or customer. This data is ingested into the enterprise inventory 305 and will eventually be stored and cleaned in a centralized knowledge repository. Cryptic identifiers 403 are identifiers, such as employee IDs that by themselves are not valuable. However, they can be tied back to a data element once connected and they become a gateway to personally identifiable information. Such as tying an employee ID back to an employee's name or social security number. Cryptic identifiers 403 may be converted into regular expressions in the centralized knowledge repository.

Figure 5:
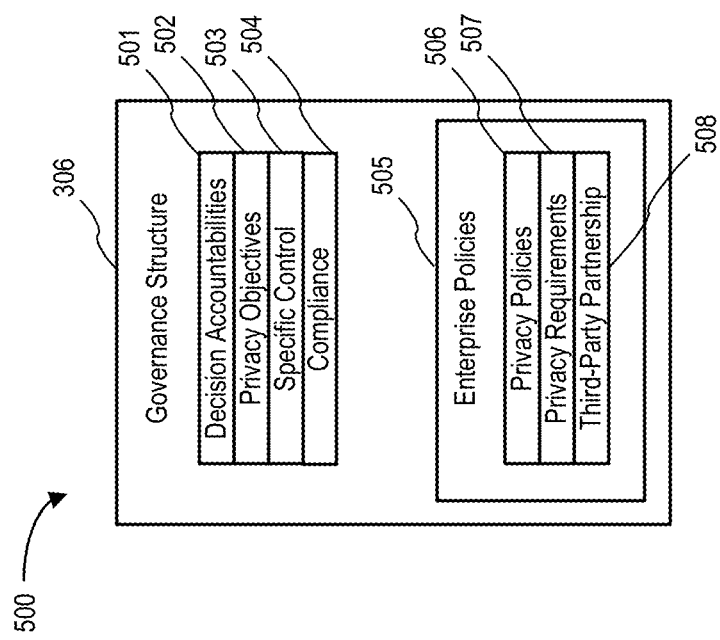
FIG. 5 is a data structure for a governance structure in accordance with some embodiments.

FIG. 5 is a data structure 500 for a governance structure 306 in accordance with some embodiments. Governance structure 306 is an overarching framework consisting of fundamental features that define clarity of the overall strategy/objectives, membership/roles/responsibilities and documented policies with measures and controls which verify that overall governance objectives are achieved. Decision Accountabilities 501 define roles and responsibilities of the governance participants including clarity of decision ownership and those who provide input, agree or are informed. Privacy Objectives 502 are the overall privacy strategy and objectives which will be enabled, managed and controlled. Specific Control 503 are defined by the policy and requirements that will be monitored to ensure decisions and outcomes are consistent with the overall strategy and objectives. Compliance 504 are the outcomes of the specific controls will determine if decisions and outcomes are in compliance with the policy defined by the governance structure. Enterprise Policies 505 is an overall catalog of policies managed across the enterprise, organization, and/or business. Privacy Policies 506 are specifically defined privacy intentions, with supporting principles and processes, which will be executed by the appropriate decisions makers who will be held accountable to achieve the privacy policy outcomes. Privacy Requirements 507 are a set of requirements, standards and best practices that will be implemented by the appropriate assets to deliver on the outcomes defined by the privacy policy. Third-party partnerships 508 either provide services to or from the employees of the enterprise who are accountable and expected to achieve and comply with the objectives identified by the governance structure.

Figure 6:
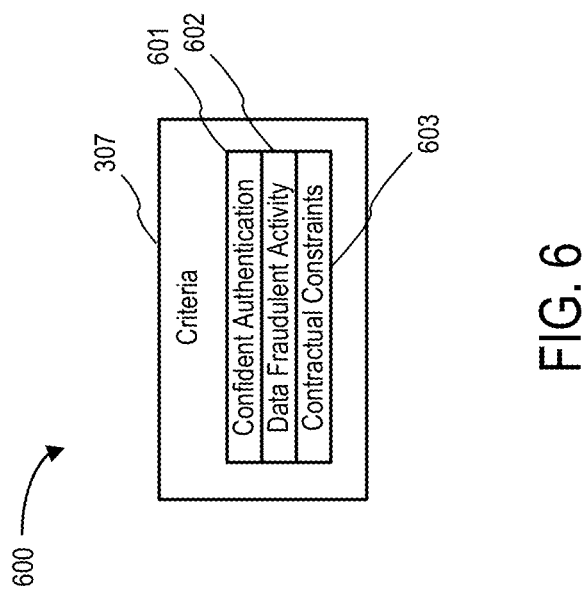
FIG. 6 is a data structure for criteria according to some embodiments.

FIG. 6 is a data structure 600 for criteria 307 according to some embodiments. The criteria 307 is information received from internal and external sources for how information should be maintained and managed. Criteria 307 is specifically used to populate the centralized knowledge repository 307 and later create rules by the data engineer 309 to review data assets. Criteria 307 will also be used in production operations 311 and by operations staff 312 to remediate any identified noncompliance or data issues. The confident authentication 601 is criteria 307 specifically dictating who can access or not access data and information. The level at which access is dictated could be at an individual or group level. The term "group" in this context could mean vendor, contractor, business operations or technical sub group of the enterprise. For example, if John Smith calls in to the enterprise or entity to have their data deleted, the confident authentication procedures would ensure and validate that the person is in fact John Smith and that his data can be deleted. This can be done by granting and using a unique customer or individual identifier. In some embodiments, the data fraudulent activity 602, might include many different types of criteria 307 to look for fraudulent activity, such as, for example, parameters above (or below) threshold values, pre-determined periods of time (e.g., once per year), data indicating that a person wants to delete data (and remove a data trail that might potentially be used to detect fraud), etc. The contractual constraints 603 is criteria 307 specifically dictated by contractual obligations provided by either 3rd party vendors or customers.

Figure 7:
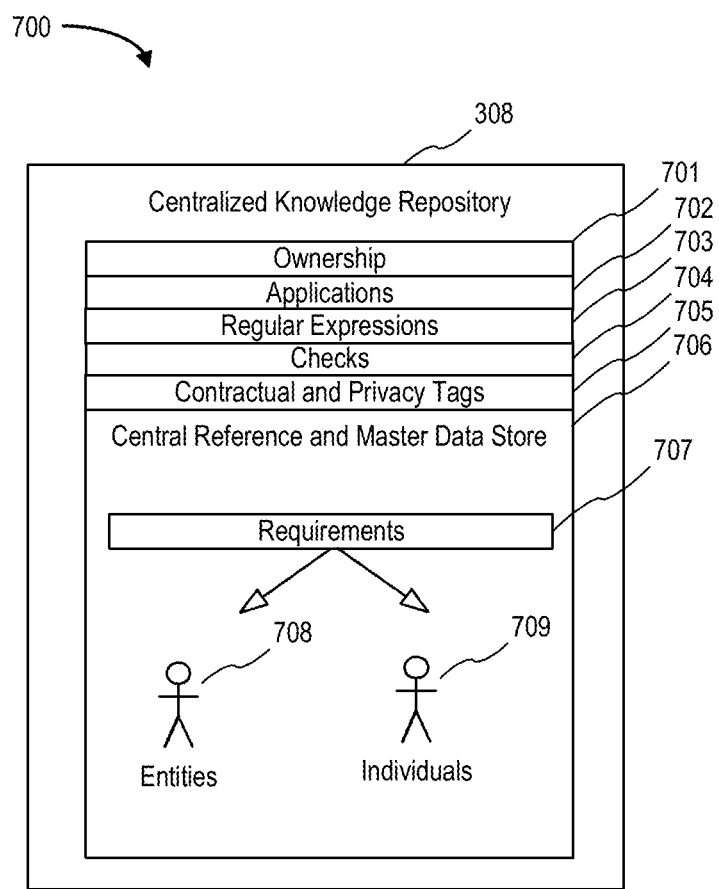
FIG. 7 is a data structure for a centralized knowledge repository in accordance with some embodiments.

FIG. 7 is a data structure 700 for a centralized knowledge repository 308 in accordance with some embodiments. The centralized knowledge repository 308 is a repository that stores all of the information regarding obligations for which the enterprise is responsible. The repository 308 also provides access to the data engineers 309 to access to configure enterprise systems 310 uses to validate the requirements 707 in the knowledge repository 308 for entities 708 (e.g., including other applications) and/or individuals 709 (e.g., employees of an enterprise). The repository 308 is also leveraged by production operations 311 to view failed events logged by the enterprise system 310 in questions for further remediation. The ownership 701 are the owners of information, enterprise system 310 results, and production operations 311 access may be stored within the centralized knowledge repository 307.

The applications 702 are a list of enterprise applications stored within the centralized knowledge repository 308 and allows the data engineer 309 to tell the enterprise system 310 what application to be pointed at and trace the results back to an application for production operations 311 to subsequently remediate. Regular expressions 703 are a consistent set of regular expressions stored within the repository 308 for the data engineer 309 to configure in the enterprise system 310. The checks 704 are a consistent set of checks (e.g., ABC checks) that are stored within the repository 308 for the data engineer 309 to configure in the enterprise system 310. Contractual and privacy tags 705 are a consistent set of contractual and privacy tags that are stored in the repository 308 for the data engineer 309 to configure within the enterprise system 310 (e.g., to be applied against a given data element, set, or asset). The central reference and master data store 706 stores all the enterprise keys, codes, entities, and individuals in the authoritative format.

Figure 8:
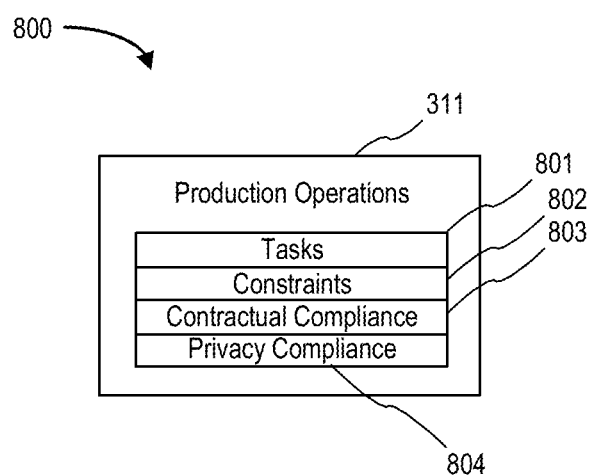
FIG. 8 is a data structure for production operations according to some embodiments.

FIG. 8 is a data structure 800 for production operations 311 according to some embodiments. The production operations 311 is a repeatable process that is the mechanism to manage each transaction in support of the business. Specific transactions may reference the knowledge repository 308 for the needed information to achieve the outcome of the process. The tasks 801 are specific activities executed by the operations staff. Constraints 802 are a set of known or unknown limitations that may restrict the production operation, tasks or operations staff. Contractual compliance 803 are specific contract terms that are controlled to ensure compliance with third-party partner agreements. Privacy Compliance 804 are specific privacy outcomes, managed by controls, which will determine if decisions and outcomes are in compliance with the defined privacy policy.

Figure 9:
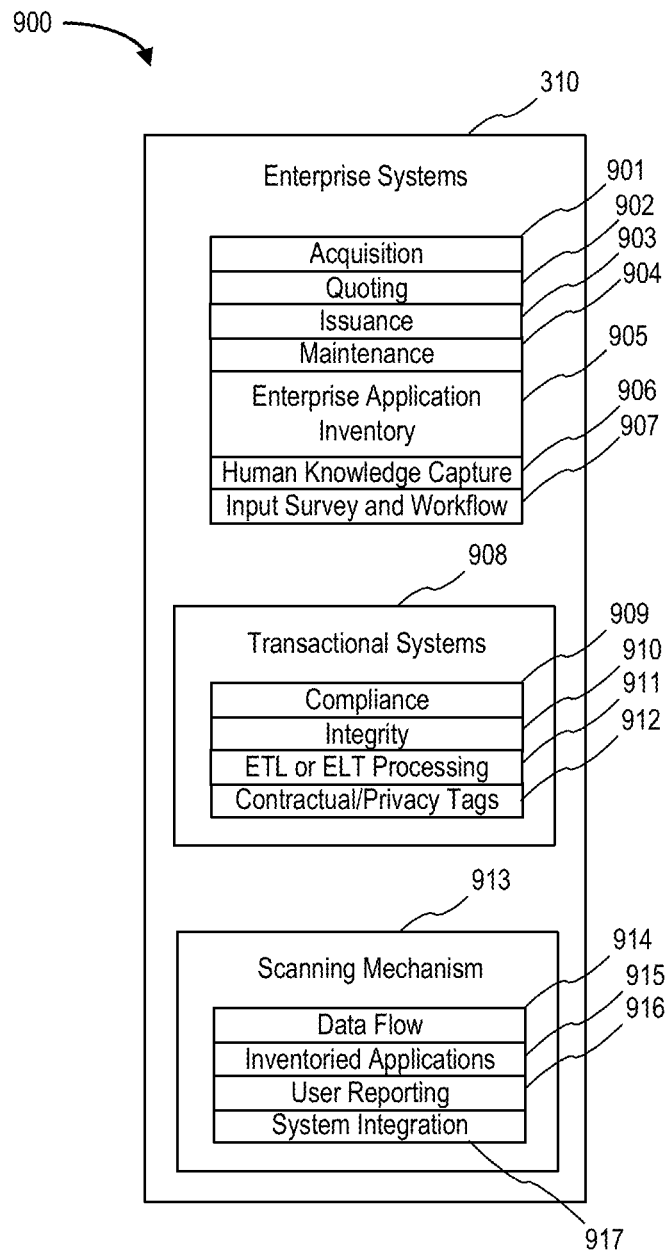
FIG. 9 is a data structure for enterprise systems in accordance with some embodiments.

FIG. 9 is a data structure 900 for enterprise systems 310 in accordance with some embodiments. As discussed previously, enterprise systems 310 are the systems throughout the enterprise fabric that contain data that must adhere to the constraints captured, persisted, and served by some embodiments. The acquisition 901 systems are those systems that take data into the institution from outside origins. Non-limiting examples include feeds from third-party sources, web sites that may be used by parties such as external customers 302, or that are operated by operations staff 312 such as customer service representatives. Such points of acquisition read the compliance and regulation information in the centralized knowledge repository 308 and adhere to the previously persisted rules as a means of ensuring that data that is being acquired is either stopped if it is not in alignment with the rules, or properly flagged as having issues or aligned to the rules if possible.

Quoting 902, issuance 903, and maintenance 904, are key aspects of the insurance process, each of which can generate new derived, aggregated, or other new data elements as part of the lifecycle of policy work. For each such activity, the workflows have a connection to the centralized knowledge repository 308, and ensure that all new elements are adhering to the rules of compliance and regulation. The enterprise application inventory 905 is a system that can be leveraged to gain knowledge on all the different applications in the enterprise. The owners and technical leads, as well as detailed information on the application is stored here.

The human knowledge capture 906 is the knowledge on the process that is gained from experience at the company. This knowledge can be captured and utilized in this process. Input surveys and workflow 907 is another method to extract enterprise knowledge and is a tool that can be leveraged. Once the owners are identified by the enterprise application inventory 905, they can be leveraged to gain additional understanding through input surveys and workflow 907 on these applications throughout the enterprise.

The transactional systems 908 are the systems in the enterprise that perform the actual execution of the activities above. These systems have particular behaviors around four key areas that follow. The compliance 909 is the engineering that ensures the system meets the compliance objectives. Such objectives as data retention schedules, regular expressions for known patterns of risky data elements, and so on are codified in an executable machine language. All systems are scored for their compliance requirement level, and this is stored as part of the criteria 307 that is stored in the centralized knowledge repository 308. Compliance 909 requirements of systems that have such levels are then executed as part of normal system operations. Integrity 910 concerns are a set of system behaviors that ensure that data remains sound even as it undergoes additions, changes, or deletions related to the requirements. When bringing data into compliance 909, such changes can have a propagating impact. The most challenging example is typically deletion. For example, if data is being brought through acquisition 901 for issuance 903 of a policy, but the rules dictate that we cannot have that data and must delete it, the system must delete it—however, that data must be cross-referenced by other data. Even if that other data is not in scope per the criteria 307, keeping that other data sound becomes part of the system responsibility.

ETL or ELT Processing 911 is the design of such ETL work to preserve and align all information from the centralized knowledge repository 308 to the core business data through processing. ETL processes by their nature must process the core business data—that is what they are designed to do. But ETL processing that is handling constrained data must also keep the compliance and regulation rules attached. Such mechanisms include columns in database tables, objects in JSON objects, and other data elements that are processed by ETL like any other elements, but contain the criteria 307 and have computer code that enforces the rules of the governance structure 306.

Contractual and privacy tags 912 are the set of data elements that move throughout the enterprise to facilitate much of the computer execution. These are stored in the centralized knowledge repository 308, retrieved by the enterprise systems 310, and processed by the transactional systems 908, and in particular are preserved by the ETL or ELT processing 911. These can range from simple name value pairs, such as whether a customer chose to opt-in, having a value of yes or no; up to large contracts encoded in large JSON objects that required the skills of a data engineer 309 to create.

The scanning mechanism 913 is a mechanism to gather information from the enterprise to assist with requirements and answering the criteria 307. The data flow 914 is how the data is moving throughout the enterprise. This is captured by the scanning mechanism 913 as the data moves from application to application. The inventoried applications 915 represent the various applications that are used throughout the enterprise. These applications store data and there can be many of these throughout the enterprise. The scanning mechanism 913 will identify these as well as how the data moves between them. The user reporting 916 represents the various models and reports that an enterprise will use to share knowledge and data. They ultimately contain data and will be captured by the scanning mechanism 913. The system integration 917 represents how the scanning mechanism 913 interacts with the entire enterprise system. It may be integrated in such a way that it can scan inventoried applications 915, user reporting 916, and the data flow 914.

Thus, some embodiments may let an enterprise source third-party data from proprietary data vendors. Such relationships may be detailed by a contract that commits enterprise to answering questions around the usage of the proprietary data. Moreover, in some cases Information Technology Outsourcing ("ITO") and/or Business Process Outsourcing ("BPO") may access and/or view this data. In addition, this data might include Personally Identifying Information ("PII") and/or Sensitive Personal Information ("SPI").

FIG. 10 is a data characterization map 1000 according to some embodiments. In particular, asset scores (requiring protection mechanisms including bronze, silver, and gold) are targeted according to decision magnitude and direct processing. High-impact, fast-moving data needs more controls (e.g., gold) as compared to low-impact, slow-moving data (e.g., bronze). A high decision magnitude might mean that if the enterprise is unable to produce the necessary information in accordance with a contract the vendor could stop doing business, pull the data feed, and/or pursue legal action against the enterprise. This could cause a complete stop of data assets leveraging risk scoring. A medium case might mean that the vendor may pull their data and data assets that leverage risk scoring become less reliable. As a result, the enterprise's ability to price business may become less reliable. A "high" direct processing score might mean that the moment the vendor pulls the data feed, real-time business assets will be impacted immediately. For example, the vendor may allow for from 30 to 90 days for the enterprise to respond with requested contract information.

Figure 11:
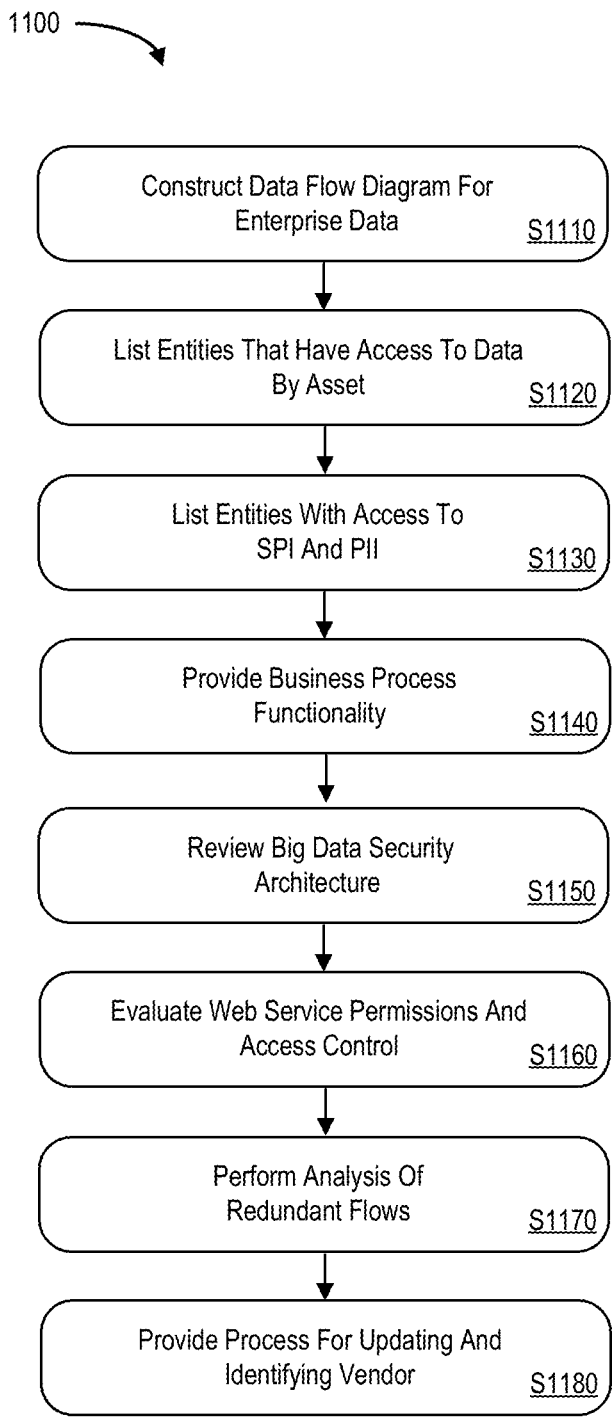
FIG. 11 is a recommendation process in accordance with some embodiments.

FIG. 11 is a recommendation process 1100 in accordance with some embodiments. Some or all of the steps of the process 1100 might be automated according to some embodiments (e.g., using the elements of the system 300 of FIG. 3). At S1110, an enterprise may construct a data flow diagram for a vendor's proprietary data. The data flow may display any business asset that stores the vendor's data and where it is sent. At S1120, the enterprise may list the entities that have access to the data by asset. This list will might be split, for example by external and internal vendors. The enterprise may list the entities with access to SPI/PII. This may also list how the entities are accessing the data and the type of SPI/PII.

At S1140, the enterprise may provide information about business process functionality. At S1150, the enterprise may review big data security architecture. For example, the system may analyze the tooling and design to ensure that access to data aligns to the appropriate roles, rights, and staff. At S1160, the system may evaluate web service permissions/access controls (e.g., to identify controls for granting and reviewing permissions). At S1170, the system may perform analysis of redundant flows within data flow diagram (e.g., to evaluate ways to reduce the number of necessary connections). At S1180, the system may provide the process for updating and identifying a vendor name (e.g., in active directory, what fields should be leveraged to identify vendor and the confidence behind the fields). According to some embodiments, the enterprise may grant data governance a "super-user" access account (e.g., to create an account with access to all data assets in the enterprise for governance).

Figure 12:
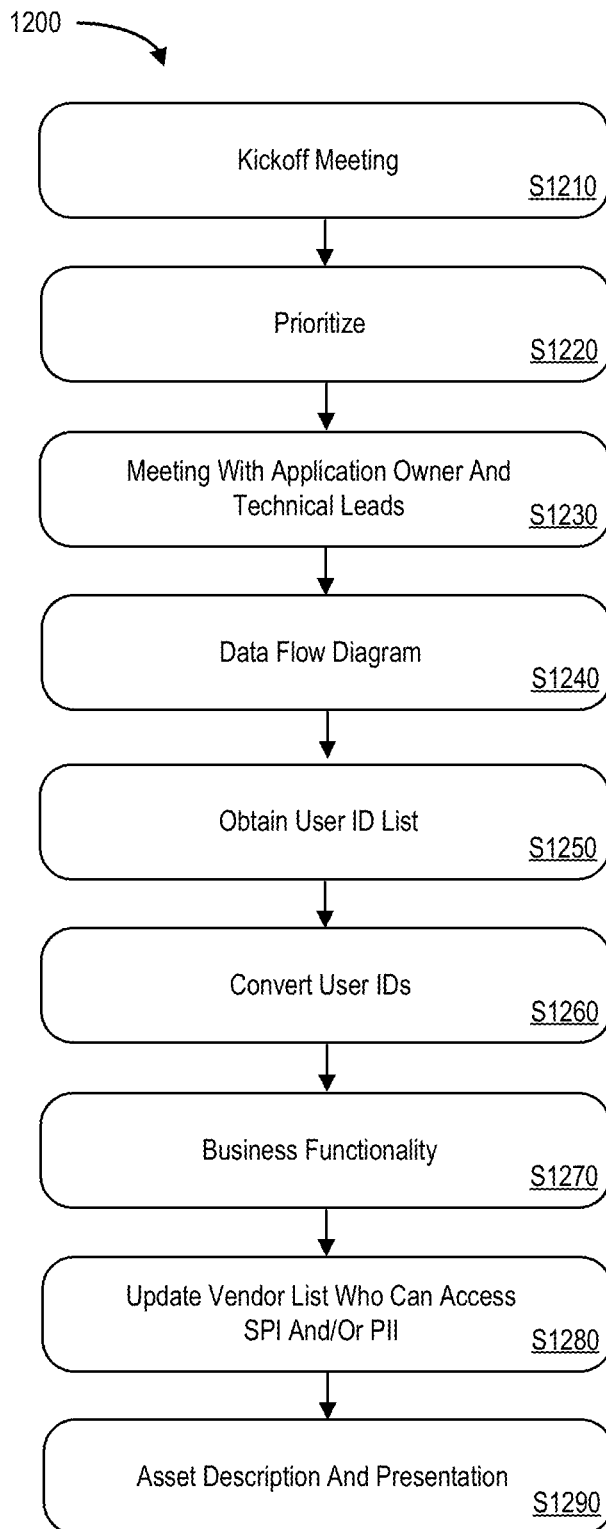
FIG. 12 is a certification process according to some embodiments.

FIG. 12 is a certification process 1200 that might be used to comply with restrictions imposed by third-party vendors of proprietary data according to some embodiments. Some or all of the steps of the process 1200 may be automated, according to some embodiments, via element of the system 300 of FIG. 3. At S1210, a kickoff meeting may discuss requirements in which a customer sets up checkpoints to meet with data governance after the kickoff and to get status updates on the progress of the certification. At S1220, the system may prioritize thing such as capacity commitment (after the kickoff meeting, data governance may decide about when to prioritize the request). This decision may be based on available capacity, desired completion date, and conflicting priorities. At S1230, a meeting with app owners and/or tech leads may be arranged to identify an initial "landing spot" for the data, and reach out to the application owner and technical lead for that asset. It is useful, for example, to check if there is a preferred point of contact instead based on past certifications At S1240, a data flow diagram may be constructed after meeting with each data asset's point of contact, it's important to start putting them into a diagram to paint a clear picture about how each of these assets are moving amongst one another. At S1250, the system may get a User ID list, and a User ID Template may act as a place to keep track of all User IDs, emails, and active directory groups.

At S1260, the user ID to ITO/BPO Vendor conversion may be performed. At S1270, business functionality may use a mapping database template to update the business functionality for each data asset. At S1280, the system may update the template with a new distinct list of vendors that can view the specific data that belongs to a third-party (e.g., SPI and/or PII elements). At S1290, an asset description may note any process improvement opportunities noticed along the way. These may be added as an additional recommendation. After the asset description has been completed and reviewed, the system may share findings with the customer. According to some embodiments, some or all of the steps described in connection with FIGS. 11 and 12 may be automated to create a series of tasks (e.g., data to be deleted, further controls to be implemented) comprising an "action plan" to help ensure (or demonstrate) compliance with any restrictions that are associated with proprietary data stored at an enterprise. Those tasks might then be manually or automatically implemented according to various embodiments.

Figure 13:
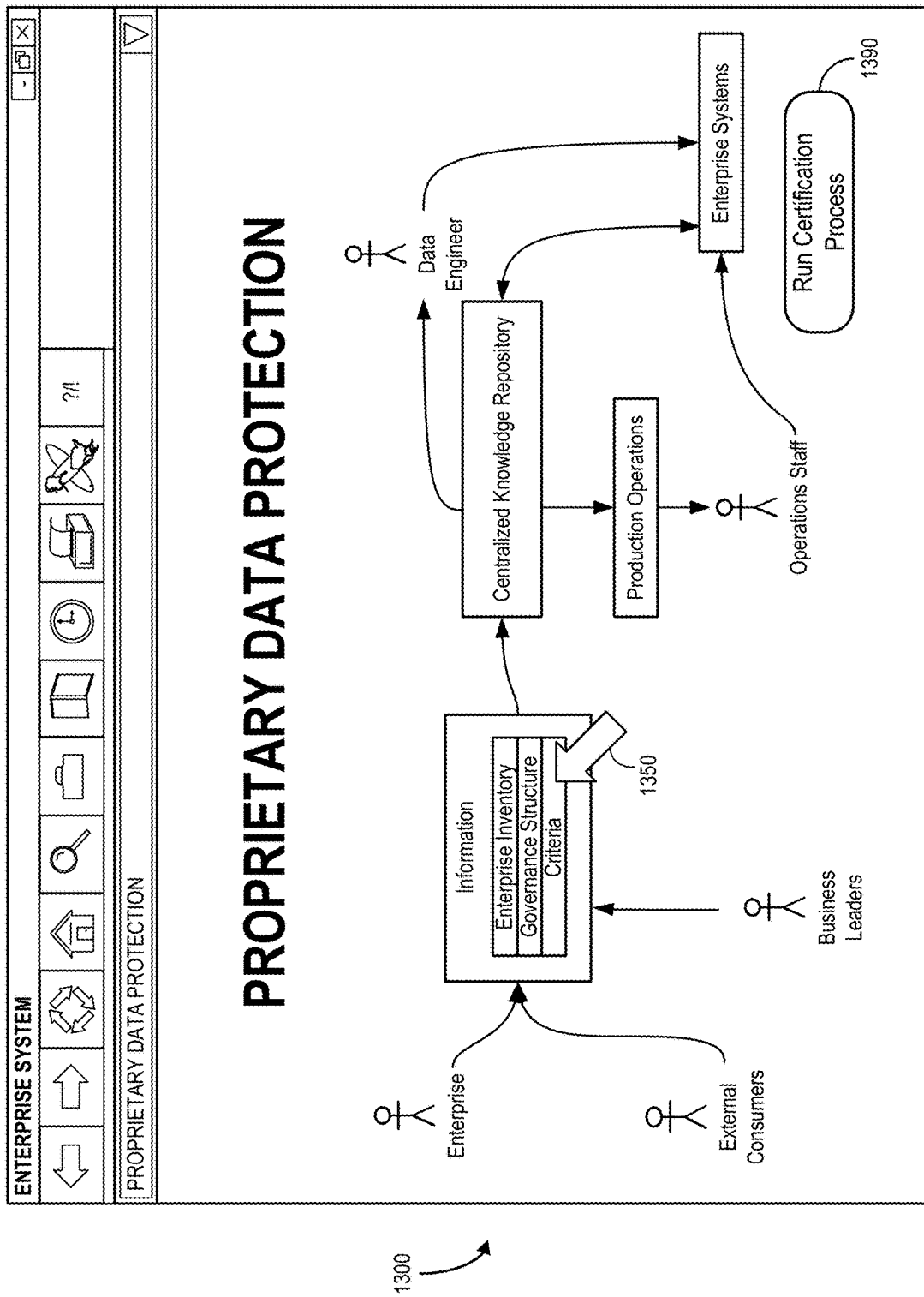
FIG. 13 illustrates a computing environment interactive user display in accordance with some embodiments.

FIG. 13 illustrates a computing environment interactive user display 1300 in accordance with some embodiments. The display 1300 might be used, for example, by a data engineer 309 or operations staff 312. The display 1300 includes information about proprietary data protection. According to some embodiments, the user can operate a computer pointer 1350 to receive more information about the proprietary data protection system, etc. A "Run Certification Process" 1390 icon might be selectable by the user to initiate a proprietary date restriction review process.

Figure 14:
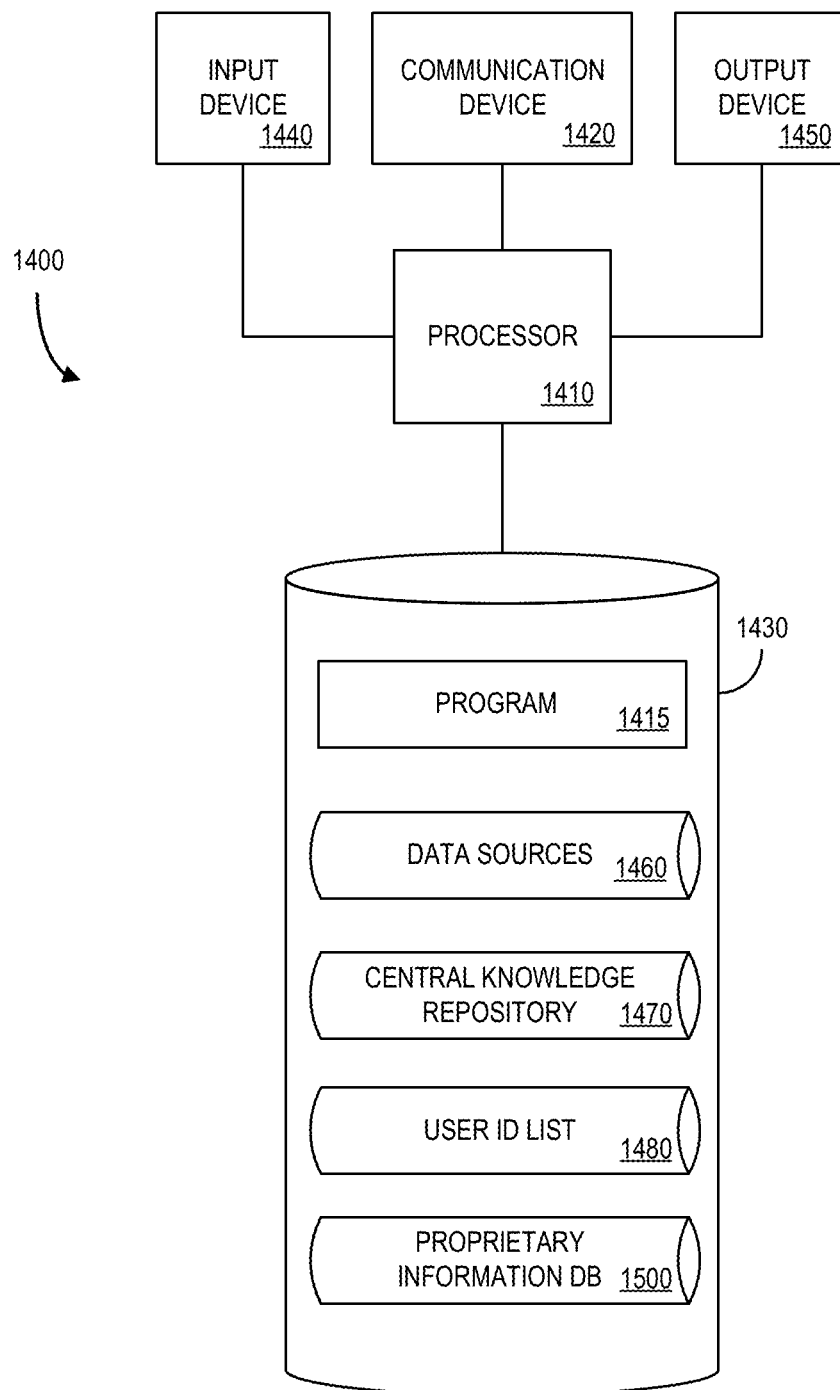
FIG. 14 is a block diagram of an apparatus in accordance with some embodiments of the present invention.

The embodiments described herein may be implemented using any number of different hardware configurations. For example, FIG. 14 illustrates a system 1400 that may be, for example, associated with the system 100 of FIG. 1. The system 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote user terminals, data stores, and/or or other communication devices (e.g., PCs and smartphones). Note that communications exchanged via the communication device 1420 may utilize security features, such as those between a public internet user and an internal network of the insurance enterprise. The security features might be associated with, for example, web servers, firewalls, and/or PCI infrastructure. The system 1400 further includes an input device 1440 (e.g., a mouse and/or keyboard to enter information about compliance, hardware resources, inputs, outputs, etc.) and an output device 1450 (e.g., to output reports regarding system administration, results, current proprietary data statuses, etc.).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1415 and/or a compliance engine or application for controlling the processor 1410. The processor 1410 performs instructions of the program 1415, and thereby operates in accordance with any of the embodiments described herein. For example, the processor 1410 may access an enterprise proprietary data store contains a set of electronic data records, each electronic data record having with proprietary data and an associated governance structure. The processor 1410 may receive the proprietary data and associated governance structure from the enterprise proprietary data store and define enterprise-wide decision accountabilities for the proprietary data based on the governance structure. The processor 1410 may also define privacy objectives for the proprietary data based on the governance structure along with specific machine-level controls to test and confirm compliance with the governance structure.

The program 1415 may be stored in a compressed, uncompiled and/or encrypted format. The program 1415 may furthermore include other program elements, such as an operating system, a database management system, and/or device drivers used by the processor 1410 to interface with peripheral devices.

As used herein, information may be "received" by or "transmitted" to, for example: (i) the system 1400 from another device; or (ii) a software application or module within the system 1400 from another software application, module, or any other source.

In some embodiments (such as shown in FIG. 14), the storage device 1430 further stores a data sources 1460 (e.g., storing information about proprietary data sources), a central knowledge repository 1470 (e.g., storing governance structures), a user ID list 1480, and a proprietary information database 1500. An example of a database that might be used in connection with the system 1400 will now be described in detail with respect to FIG. 15. Note that the database described herein is only an example, and additional and/or different information may be stored therein. Moreover, various databases might be split or combined in accordance with any of the embodiments described herein. For example, the data sources 1460 and/or proprietary information database 1500 might be combined and/or linked to each other within the program 1415.

Figure 15:
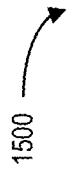
FIG. 15 is a portion of a proprietary information database in accordance with some embodiments.

Referring to FIG. 15, a table is shown that represents the proprietary information database 1500 that may be stored at the system 1400 according to some embodiments. The table may include, for example, entries associated with proprietary information. The table may also define fields 1502, 1504, 1506, 1508, 1510, 1512 for each of the entries. The fields 1502, 1504, 1506, 1508, 1510, 1512 may, according to some embodiments, specify: a proprietary information identifier 1502, a data source 1504, a description 1506, a governance structure 1508, an enterprise inventory 1510, and compliance 1512. The proprietary information database 1500 may be created and updated, for example, based on information electrically received about a new proprietary data source, an adjustment to data policies, etc.

The proprietary information identifier 1502 may be, for example, a unique alphanumeric code identifying PII or SPI information. The data source 1504 may identify where the data came from and the description 1506 may describe what the information means. The governance structure 1508 may define how information is protected in accordance with any the embodiments described herein 1508. Similarly, the enterprise inventory 1510 may define the applications, employee, and/or third-parties that may access the proprietary data. The compliance 1512 may indicate if the access and/or changes to the data met the obligations required by contacts, regulations, laws, etc.

Figure 16:
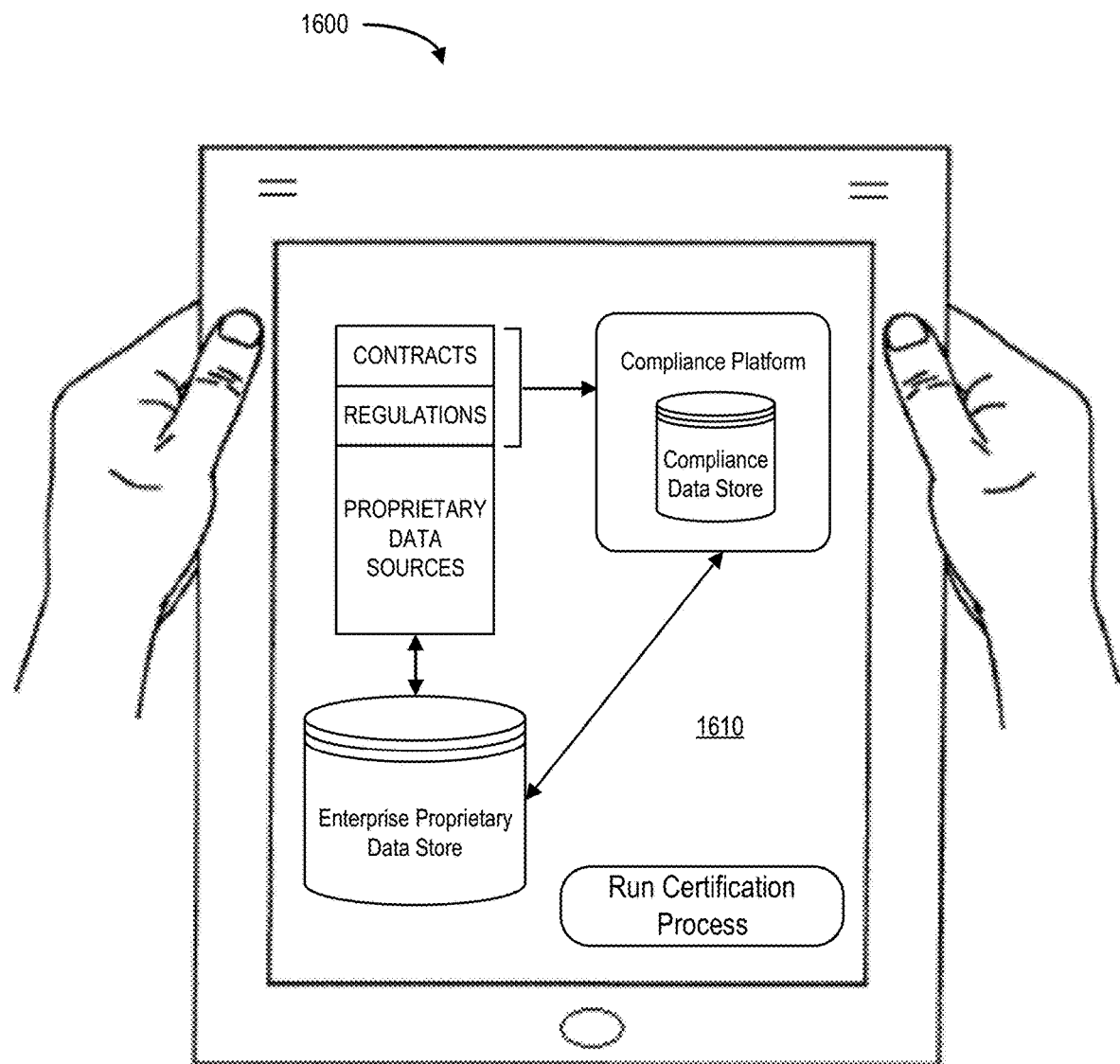
FIG. 16 illustrates a tablet computer displaying proprietary data protection user interface according to some embodiments.

Although specific hardware and data configurations have been described herein, note that any number of other configurations may be provided in accordance with embodiments of the present invention (e.g., some of the databases described herein may be combined or stored in external systems). Similarly, although a certain number of computing components were provided in connection with some embodiments described herein, other numbers of components (and different types of components) might be used instead. Still further, the displays and devices illustrated herein are only provided as examples, and embodiments may be associated with any other types of user interfaces. For example, FIG. 16 illustrates a handheld tablet computer 1600 displaying a proprietary information display 1610 according to some embodiments. The proprietary information display 1610 might include various proprietary information that can be selected and/or modified by a user of the handheld computer 1600 (e.g., to see additional information, define new proprietary information to be created, adjust an existing proprietary information file type, etc.).

Thus, embodiments may let an enterprise answer questions posed by third-party data vendors and providers. Moreover, the enterprise may identify process improvements to reduce completion time on vendor contracts and improve data security for business assets. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate proprietary data protection for an enterprise, comprising:
   (a) an enterprise proprietary data store containing a set of electronic data records, each electronic data record having proprietary data and an associated governance structure; and
   (b) a compliance computer platform, coupled to the proprietary data store, including:
      a computer processor, and
      a computer memory coupled to the computer processor and storing computer instructions that, when executed by the computer processor, cause the compliance computer platform to:
         (i) receive the proprietary data and associated governance structure from the enterprise proprietary data store,
         (ii) automatically define enterprise-wide decision accountabilities for the proprietary data based on the governance structure,
         (iii) define privacy objectives for the proprietary data based on the governance structure and generalize requirements for scalability across multiple systems,
         (iv) define specific machine-level controls to test and confirm compliance with the governance structure and reduce a number of data searches and reviews processed by the system, wherein the defined machine-level controls are elements that are monitored to determine compliance with the governance structure,
         (v) automatically creating an action plan including a generation of a series of tasks to help ensure or demonstrate compliance with the decision accountabilities, privacy objectives, and specific machine-level controls,
         (vi) automatically execute the series of tasks in the action plan, and
         (vii) determine asset protection scores using a data characterization map based on decision magnitude and direct processing;
   (c) a third-party platform transmitting a data feed, including information about the governance structures, to the compliance computer platform via security features and a distributed communication network; and
   (d) a central reference and master data store, with contractual and privacy tags, connected to transactional systems to facilitate compliance and integrity and is carried among the transactional systems and persistent data assets via Extract, Transform, and Load ("ETL") processing,
   wherein a mechanism identifies and tags information defining appropriate ownership and identifies and tags information when ownership of the information changes;
   wherein a scanning mechanism: 1. scans inventoried applications, user reporting and data flow for cryptic identifiers tied to the proprietary data and converts the cryptic identifiers into regular expressions specifying a pattern, and 2. screens and refines with a human knowledge scanning mechanism to validate process results; and
   wherein checks facilitated by contractual and privacy tags log events are stored in a centralized repository for remediation of data not meeting contractual or privacy requirements.

2. The system of claim 1, wherein an identity of an external consumer is validated against criteria for confident authentication and flagged for potentially fraudulent activity.

3. The system of claim 1, wherein contractual constraints are converted into enterprise-wide system requirements.

4. The system of claim 1, wherein contractual and privacy requirements are tagged to unique entities in a central reference and master data store of entities and individuals for property and causality customers identifying which requirements must be satisfied.

5. The system of claim 1, wherein a flow of information across repositories is scanned.

6. The system of claim 5, wherein information around data flowing among inventoried applications is digitized into technology that allows for user reporting and system integration.

7. The system of claim 1, wherein acquisition, quoting, issuance, and maintenance of property and casualty customers is integrated into enterprise systems.

8. The system of claim 1, wherein the system connects a user to an enterprise application inventory to extract system ownership and contacts owners with requirements.

9. The system of claim 1, wherein requirements are converted into tasks, designed in a central reference, and stored in the system such that the tasks can be applied across the enterprise.

10. The system of claim 1, wherein systems and requirements for an inventory of information are integrated into production operations and stored as constraints for inputs within the enterprise.

11. The system of claim 1, wherein the system compiles, stores, and retrieves information of contractual compliance across systems in an inventory.

12. The system of claim 1, wherein identified entity data are deleted from business assets and removed from systems across the enterprise.

13. The system of claim 1, wherein inputs are gathered throughout the enterprise and used to validate desired requirements.

14. The system of claim 1, wherein privacy requirements are applied and controlled with supporting third-party partnerships.

15. The system of claim 14, wherein privacy requirements are managed and integrated with additional non-privacy enterprise policies.

16. A computerized method to facilitate proprietary data protection for an enterprise, comprising:
   receiving, by a compliance computer platform, proprietary data and an associated governance structure from an enterprise proprietary data store, wherein the enterprise proprietary data store contains a set of electronic data records, each electronic data record having proprietary data and an associated governance structure;
   automatically defining, by the compliance computer platform, enterprise-wide decision accountabilities for the proprietary data based on the governance structure;
   generalizing requirements for scalability across multiple systems;
   defining, by the compliance computer platform, privacy objectives for the proprietary data based on the governance structure;
   defining, by the compliance computer platform, specific machine-level controls to test and confirm compliance with the governance structure and reduce a number of data searches and reviews processed by the system, wherein the defined machine-level controls are elements that are monitored to determine compliance with the governance structure;

automatically creating, by the compliance computer platform, an action plan including a generation of a series of tasks to help ensure or demonstrate compliance with the decision accountabilities, privacy objectives, and specific machine-level controls;

automatically executing, by the compliance computer platform, the series of tasks in the action plan;

determining asset protection scores using a data characterization map based on decision magnitude and direct processing;

transmitting, from a third-party platform, a data feed including information about the governance structures, to the compliance computer platform via security features and a distributed communication network;

facilitating compliance and integrity via a central reference and master data store, with contractual and privacy tags, connected to transactional systems, wherein the central reference and master data store is carried among the transactional systems and persistent data assets via Extract, Transform, and Load ("ETL") processing;

identifying and tagging, via a mechanism, information defining appropriate ownership;

identifying and tagging information when ownership of the information changes;

scanning, via a scanning mechanism, inventoried applications, user reporting and data flow for cryptic identifiers tied to the proprietary data and converting the cryptic identifiers into regular expressions specifying a pattern;

screening and refining, via a human knowledge scanning mechanism, to validate process results; and wherein checks facilitated by contractual and privacy tags log events are stored in centralized repository for remediation of data not meeting contractual or privacy requirements.

17. The method of claim 16, wherein contractual constraints are converted into enterprise-wide system requirements.

* * * * *